United States Patent [19]

Hood

[11] Patent Number: 5,002,005

[45] Date of Patent: Mar. 26, 1991

[54] LOW-TIRE WARNING DEVICE

[76] Inventor: Murray C. Hood, 130 Norwood Ct., Kensington, Calif. 94707

[21] Appl. No.: 396,914

[22] Filed: Aug. 21, 1989

[51] Int. Cl.⁵ .............................................. B60C 23/04
[52] U.S. Cl. ................................. 116/34 R; 116/67 R
[58] Field of Search ................. 116/34 R, 34 A, 34 B, 116/67 R, 60, 56

[56] References Cited

U.S. PATENT DOCUMENTS 3,651,455  3/1972  Hurlbutt et al. ................... 116/34 B
3,756,190  9/1973  Kendall ............................. 116/34 R Primary Examiner—William A. Cuchlinski, Jr.
Assistant Examiner—Daniel G. DePumpo

[57] ABSTRACT

A low tire warning device for pneumatic vehicle tires comprises a flexible stem attached to the vehicle side of a wheel, the stem contains an offset internal expansion chamber which will distort the stem assymetrically when pressurized by the air within the tire. This will displace a metal tip clear of an adjacent rod. If the tire pressure drops this will allow the striking tip driven by the rotating wheel to strike the rod, producing an audible sound warning.

4 Claims, 2 Drawing Sheets

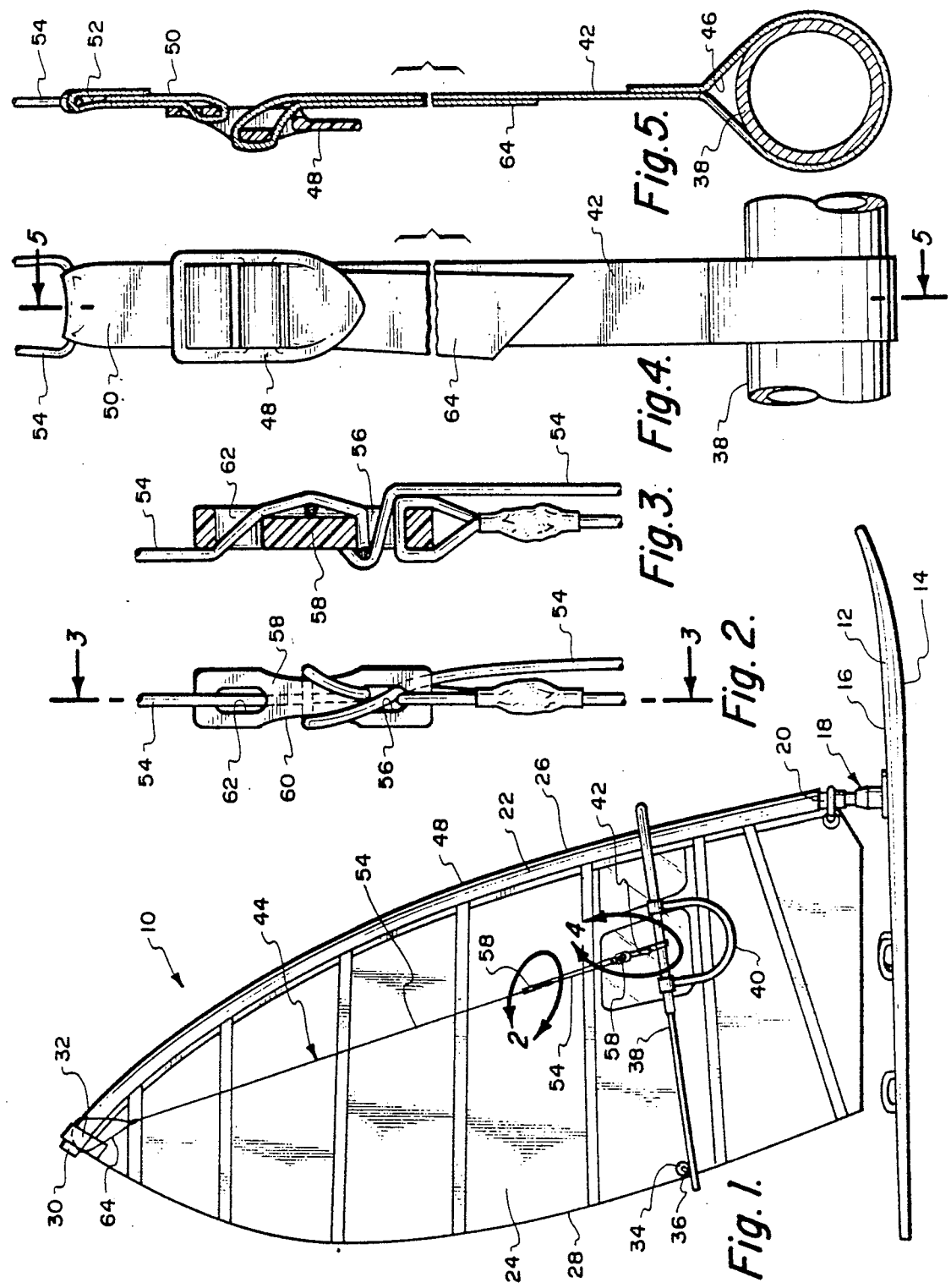

LOW-TIRE WARNING DEVICE

BACKGROUND

1. Field of Invention

This field of invention relates to automotive vehicles with pneumatic tires and specifically to underinflated (low) tires.

2. Prior Art

There is presently no method in common use which detects low tires except visual examination or testing the tire pressure with portable gauge or one fixed to the inflating valve. It is difficult to visually detect a low tire, particularly at night, during inclement weather or when the vehicle is in motion. Low tires increase fuel consumption, overheat, wear unevenly, and wear out prematurely.

OBJECTS AND ADVANTAGES

Accordingly one object of my invention is to provide a device which makes it easy for one to detect a low tire, regardless of visibility or inclement weather.

Other objects are to provide such a device which is simple and of low cost construction, which is resistant to damage, and which will not be affected by dirt, oil or grease. Further objects and advantages will become apparent from a consideration of the drawings and ensuing description.

Another object is to provide such a device as will audibly signal a low tire warning while a vehicle is in motion, regardless of the vehicles rate of speed.

DRAWING FIGURES

A BRIEF DESCRIPTION OF THE PREFERRED EMBODIMENTS OF THE INVENTION

Figure 1:
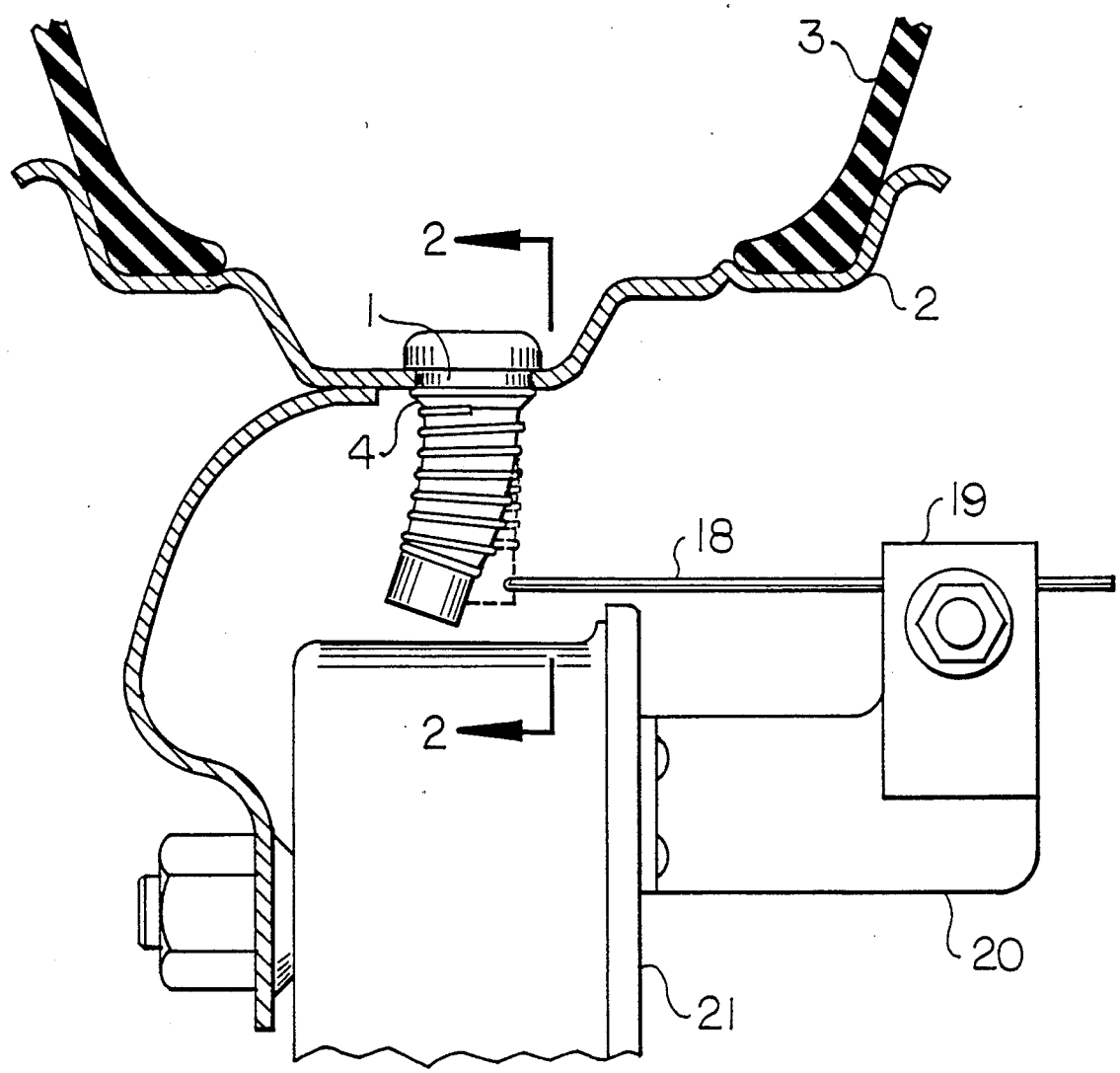
FIG. 1 is a partial sectional view of a low tire warning device according to the invention.
Figure 1:
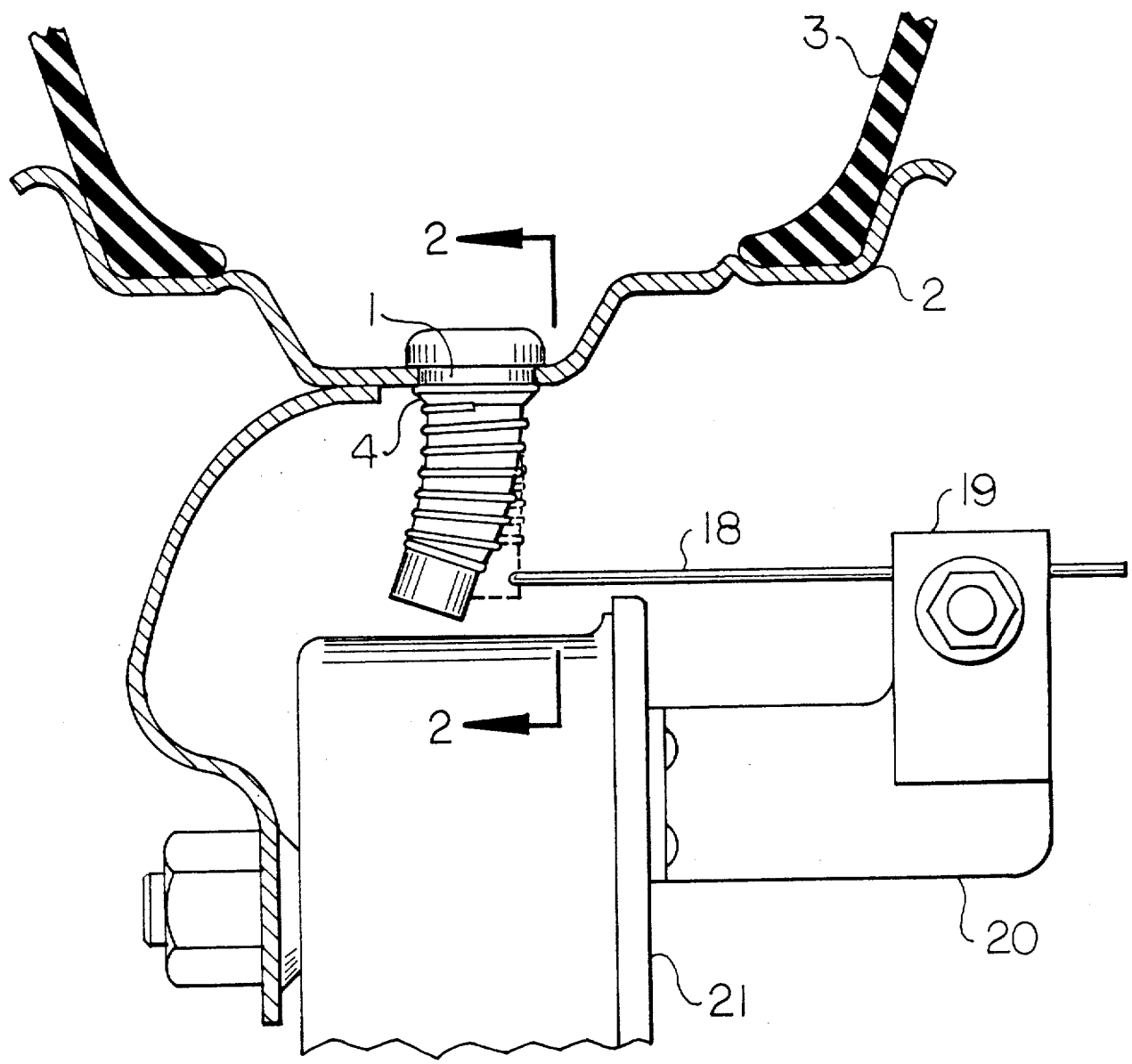

Flexible stem 4 is inserted in hole 1 in vehicle road wheel 2 before installing pneumatic tire 3.

The present invention consists of an approximately cylindrical flexible neoprene or other elastic rubberlike material stem 4, 1¾ inches long. Enlarged end 5. ⅞ inches diameter is immediately adjacent to rectangular section annular groove 6 which is immediately adjacent to annular ridge 7.

Hardened steel striker 8, ½ inch diameter, is integrally molded to the opposite end.

An approximately cylindrical expansion chamber 9, ⅜ inches diameter by ⅞ inches long, is contained within the stem. Chamber 9 is accessible through opening 10 in enlarged end 5.

Expansion chamber 5 axis 11 is offset from stem 4 axis 12 which produces thin side 13 and thick side 14.

Stem 4 center portion 15 is tapered to accept a tapered cylindrical wire coil spring 16 of 1/16 inch diameter wire held in place by annular ridge 17.

A 1/16 inch diameter spring steel sounding rod with a rounded end 18 is held by clamp 19 to rigid mount 20 attached to a fixed part of the vehicle 21.

OPERATION

The operation of this invention is as follows:

Flexible stem 4 is inserted in hole 1 toward the center of vehicle road wheel 2 and is retained by enlarged end 5 and annular ridge 7.

An airtight seal is effected between groove 6 and road wheel 2.

Sounding rod 18 is held by clamp 19 and adjusted to contact metal striker 8 at the desired low tire air pressure.

Inflating tire 2 to operating pressure fills expansion chamber 9 through opening 10.

The radial expansion of chamber 9 is restricted by wire coil spring 16. The longitudinal expansion of chamber 9 acts to extend the thinner side wall 13. Thicker side wall 14 will resist extension to a greater degree. This difference in extension will displace striker 8 away from and clear of sounding rod 18.

The low tire warning device is now in normal operating position. In the event of a low tire, the reduced air pressure within tire 3 and expansion chamber 9 allows the elasticity of flexible stem 4 to overcome the longitudinal expansion of expansion chamber 9. This reduces the displacement of stem 4 allowing striker 8 to contact sounding rod 18.

Rotation of vehicle road wheel 2 effects a percussive contact between striker 8 and sounding rod 18 producing a twanging sound audible to the vehicle operator indicating a low tire.

Wear at the contact of striker 8 will be negligible because striker 8 is hardened steel, sounding rod 18 is adjustable for wear and the duration of contact will be minimal.

The above described simple and reliable operation of this invention will produce a distinctive and arresting signal regardless of weather conditions, visibility or the presence of dirt, oil or grease.

While the above description contains many specificities, these should not be construed as limitations on the scope of the invention, but rather as an exemplification of one preferred embodiment thereof. Many other variations are possible, for example, in the case of a truck which has dual wheels on one side of the vehicle an additional flexible stem may be mechanically mounted on the inboard wheel and connected to the air supply stem on the outboard tire by a hose or tube.

If a remote display is desired, as in the case of a large or noisy vehicle, the movement of rod 18 may operate an electrical switch which controls a remote display within the operator's field of vision.

Other variations of sounding rod 18 are flat, square, solid or hollow. Sounding rod 18 may also operate a bell, gong, or other sounding device.

The flexible stem 4 may have other shapes, among which may be longer, shorter or different cross sections.

Striker 8 may assume various shapes or sizes and may be attached to or separated from flexible stem 4.

The flexible stem may be as an integral part of the vehicle road wheel or attached to and be remotely connected to the tires compressed air, similar to the dual-wheel example above.

Other variation examples will be visualized by an examination of the drawings and specifications.

I claim:

1. A low tire warning device for attachment to a vehicle road wheel comprising:

a. a flexible stem having a free end and containing an internal expansion chamber disposed parallel to but offset from a longitudinal axis of said stem, said stem being within a coil spring which restricts radial expansion, said stem being connectable to said wheel such that said expansion chamber is in fluid communication with the interior of said tire such that when said tire contains pressurized air, said pressurized air will expand said chamber longitudinally and displace said stem and said coil spring assymetrically, a metal striker located on the free end of said stem, and b. a metal sounding rod attached to a fixed part of said vehicle, and positioned adjacent said metal striker, whereby if said tire pressure falls, said stem and said coil spring will return toward its unpressurized shape, causing said striker to be driven by the rotation of said wheel so as to strike said sounding rod end thereby producing an audible signal.

2. A low tire warning device of claim 1 wherein said coil spring and said metal striker are one piece.

3. A low tire warning device of claim 1 wherein said metal striker is made of non metallic material.

4. A low tire warning device for attachment to a vehicle road wheel comprising:

a. a flexible stem having a free end and containing an internal expansion chamber disposed parallel to but offset from a longitudinal axis of said stem, said stem being within a coil spring which restricts radial expansion, said stem being connectable to said wheel such that said expansion chamber is in fluid communication with the interior of said tire such that when said tire contains pressurized air, said pressurized air will expand said chamber longitudinally and displace said stem and said coil spring assymetrically, whereby if said tire pressure falls, said stem and said coil spring will return toward its unpressured state and indicating means for providing a remote indication in response to said return.

* * * * *

UNITED STATES PATENT AND TRADEMARK OFFICE
CERTIFICATE OF CORRECTION

PATENT NO. : 5,002,005

DATED : March 26, 1991

INVENTOR(S) : Hood

Figure 2:
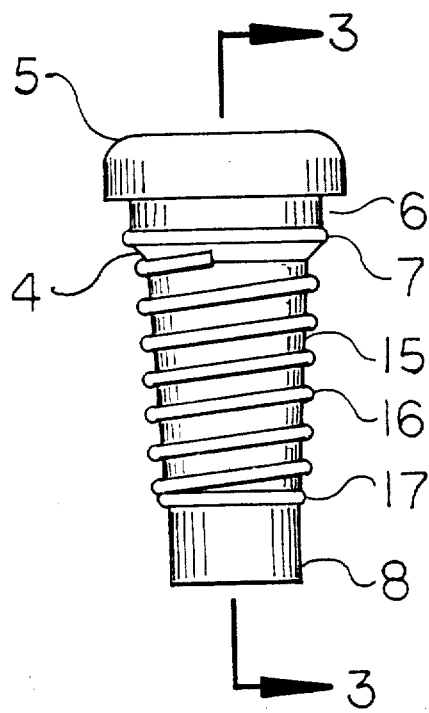
FIG. 2 is an enlarged view of a flexible stem used in such a device taken on line 2—2 of FIG. 1.
Figure 3:
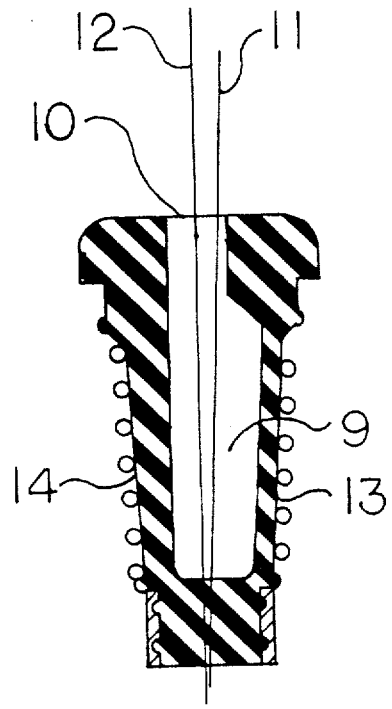
FIG. 3 is an enlarged sectional view of a flexible stem in an unpressurized state taken on line 3—3 of FIG. 2.
Figure 4:
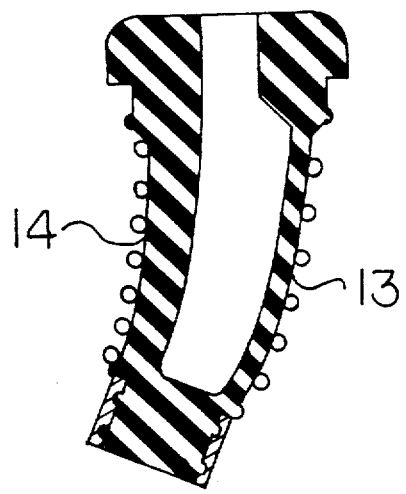
FIG. 4 is an enlarged sectional view of a flexible stem in a pressurized state taken on line 3—3 of FIG. 2.

It is certified that error appears in the above-identified patent and that said Letters Patent is hereby corrected as shown below:

Figures 1-4 should be deleted to be replaced with figures 1-4 as shown on the attached sheets.

Signed and Sealed this

Ninth Day of July, 1991

Attest:

HARRY F. MANBECK, JR.

Attesting Officer

Commissioner of Patents and Trademarks